United States Patent

Saito

[15] 3,683,344

[45] Aug. 8, 1972

[54] DISPLACEMENT-ELECTRIC SIGNAL CONVERTER

[72] Inventor: Bunjiro Saito, Tokyo, Japan

[73] Assignee: Kabushikikaisha Yokogawa Denk Seisakusho(Yokogawa Electric Works, Ltd.), Tokyo, Japan

[22] Filed: July 14, 1970

[21] Appl. No.: 54,726

[30] Foreign Application Priority Data

June 23, 1970 Japan ........................45/54644

[52] U.S. Cl. ....................................340/199, 340/210

[51] Int. Cl. ............................................G08c 19/08

[58] Field of Search ......340/199; 323/51, 57; 321/18

[56] References Cited

UNITED STATES PATENTS 3,456,132 7/1969 Dechelotte ................340/199

*Primary Examiner*—Thomas B. Habecker
*Attorney*—Hill, Sherman, Meroni, Gross & Simpson

[57] ABSTRACT

A displacement-electric signal converter having a pair of displacement detecting elements the impedances of which vary in accordance with a displacement, a rectifier including a bridge circuit, first and second capacitors, an oscillator for supplying AC current to the displacement detecting elements, a circuit for controlling voltage for the oscillator, and amplifier for amplifying current flowing through the second capacitor. In this case, the output signal is supplied to a load through a transmission line of a DC electric power source for the amplifier.

10 Claims, 7 Drawing Figures

PATENTED AUG 8 1972 3,683,344

SHEET 1 OF 6

INVENTOR.
Bunjiro Saito

BY Hill, Sherman, Meroni, Gross & Simpson
ATTORNEYS

INVENTOR.
Bunjiro Saito

BY Hill, Sherman, Meroni, Gross & Simpson
ATTORNEYS

INVENTOR
Bunjiro Saito

BY Hill, Sherman, Meroni, Gross & Simpson
ATTORNEYS

INVENTOR
Bunjiro Saito

BY Hill, Sherman, Meroni, Gross & Simpson
ATTORNEYS

INVENTOR
Bunjiro Saito
BY Hill, Sherman, Meroni, Gross & Simpson
ATTYS.

INVENTOR.
Bunjiro Saito

BY Hill, Sherman, Meroni, Gross & Simpson
ATTORNEYS

DISPLACEMENT-ELECTRIC SIGNAL CONVERTER

BACKGROUND OF THE INVENTION

1. Field of the Invention

The present invention relates to a displacement-electric signal converter which converts displacements to corresponding electric signals, and more particularly to a displacement-electrical signal converter which converts process variables, produced as mechanical displacements, corresponding to, for example, flow rate, pressure, temperature and the like to systematic or uniform electric signals and is capable of transmitting the electric signals to a receiver means disposed at a remote place.

2. Description of the Prior Art

A conventional displacement-electric signal converter has are its power source line and signal line are provided individually, that is, a four-wire system. Such a conventional converter has drawbacks that its cost becomes high, its installation is complicated because of the many lines and troubles are apt to occur.

SUMMARY OF THE INVENTION

It is a main object of the present invention to provide a displacement-electric signal converter which is capable of transmitting an electric signal obtained by converting displacement to a receiver with the so-called two-wire system in which a two-wire line is employed common to power source transmission and signal transmission.

It is another object of the present invention to provide a displacement-electric signal converter in which the zero point thereof is not shifted or moved even if its operative range is changed.

It is further object of the present invention to provide a device which produces an electric signal in proportion to displacement precisely without being affected by surrounding temperature and transmits the electric signal to a receiver positively and stably.

It is still further object of the present invention to provide a device which can easily attain an intrinsic safety.

Other objects, features and advantages of the present invention will be apparent from the following description taken in conjunction with the accompanying drawings in which like reference numerals represent like elements.

DESCRIPTION OF THE PREFERRED EMBODIMENTS

Figure 1:
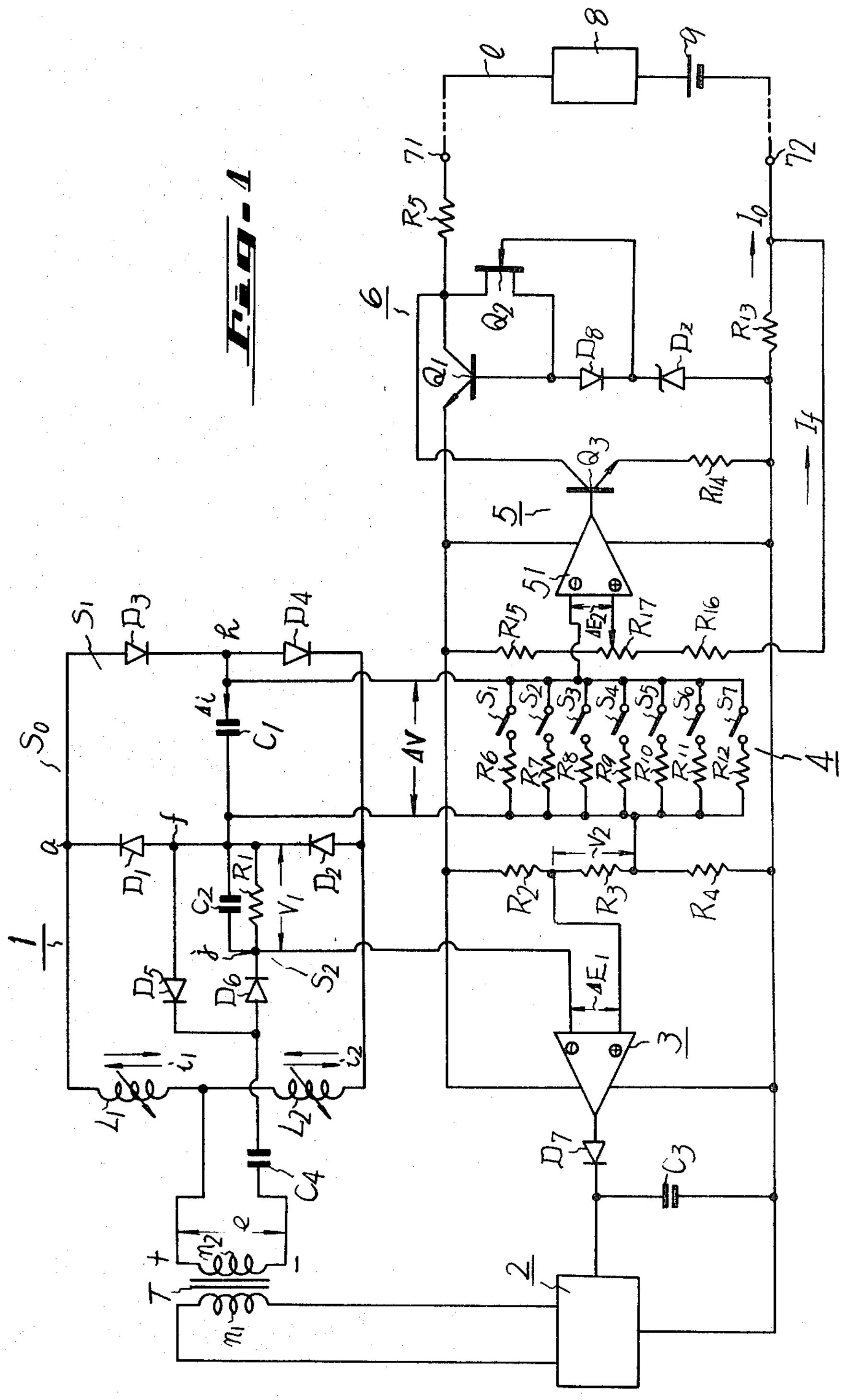
FIG. 1 is an electric connection diagram showing one embodiment of the present invention.

FIG. 1 is an electric wiring diagram showing one embodiment of the present invention. In the figure reference numeral 1 designates a displacement detecting circuit which detects process variables and produces corresponding electrical signals, the process variables being obtained as mechanical displacements. Reference numeral 2 indicates an oscillator, 3 a differential amplifier for controlling the voltage of an electric power source for the oscillator 2, 4 a range change circuit, 5 an amplifier for amplifying the electric signal derived from the displacement detecting circuit 1, 6 a constant-voltage circuit and 71 and 72 output terminals of the displacement-electric signal converter of this invention. Reference numerals 8 and 9 designate a load (receiver meter) and a voltage source (an electric power source) which are located at a place remote from the main device consisting of the displacement detecting circuit 1, oscillator 2, differential amplifier 3 and the like. The load 8 and the electric power source 9 are connected in series between the output terminals 71 and 72 through transmission lines *l*. In this case the electric power source line *l* is also employed as the signal line *l*, that is to say, the transmission system of this example is the so-called "two-wire system".

Reference characters $L_1$ and $L_2$ in the displacement detecting circuit 1 indicate a pair of coils forming a differential inductance element (inductor). In this case the number of turns of the coils $L_1$ and $L_2$ is selected equal to each other.

Figure 2:
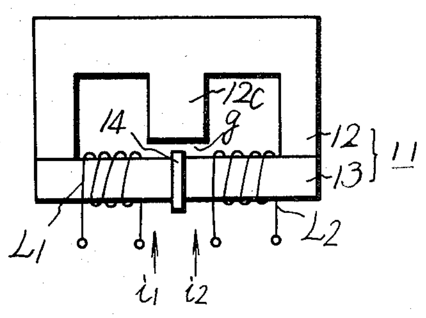
FIG. 2 is a schematic diagram illustrating, by way of example, a differential inductance element employed in the example of the present invention depicted in FIG. 1.

FIG. 2 shows, by way of example, a practical embodiment of the differential inductance element (inductor). In the figure reference numeral 11 indicates a core which consists of an E-shaped core member 12 and a rod like core member 13 the cross-sectional configuration of which is approximately rectangular. The coils $L_1$ and $L_2$ are respectively wound on the core member 13. Reference numeral 14 indicates a short-circuit ring mounted on the core member 13 between the coils $L_1$ and $L_2$ and reference character *g* a gap formed between the core member 13 and the center leg 12C of the core member 12 in which gap *g* the short-circuit ring 14 is disposed. The process variables are produced as mechanical displacements in a well-known conventional manner and thus obtained mechanical displacements are applied to the short-circuit ring 14 in this example. When the mechanical displacements are applied to the short-circuit ring 14, the ring 14 is moved or shifted to the left or right in accordance with the mechanical displacements to change the inductance between the coils $L_1$ and $L_2$ in differential manner.

Turning to FIG. 1, reference character $S_0$ in the displacement detecting circuit 1 shows a circuit portion which derives the sum and difference between currents $i_1$ and $i_2$ passing through the coils $L_1$ and $L_2$. In the circuit $S_0$ reference characters $D_1$ to $D_6$, inclusive, indicate diodes respectively, $C_1$ and $C_2$ capacitors and $R_1$ a resistor element. Free ends of the coils $L_1$ and $L_2$ connected in series are respectively connected to input terminals *a* and *b* of a rectifier circuit $S_1$ which consists of the diodes $D_1$ to $D_4$ as a bridge circuit, the connection point of the diodes $D_1$ and $D_3$ corresponding to the input terminal *a* and the connection point of the diodes $D_2$ and $D_4$ to the input terminal *b*. The capacitor $C_1$ is inserted between output terminals $f$ and $h$ of the rectifier circuit $S_1$, namely the connection point of the diodes $D_1$, $D_2$ and the connection point of the diodes $D_3$, $D_4$. Reference character T in FIG. 1 designates a transformer a primary winding $n_1$ of which is used as an oscillation coil of the oscillator 2. The oscillation output of the oscillator 2 is obtained from a secondary winding $n_2$ of the transformer T. One end of the secondary (or output) coil $n_2$ is connected to the connection point of the coils $L_1$ and $L_2$, while the other end of the coil $n_2$ is connected to the output terminal $f$ of the rectifier circuit $S_1$ through a capacitor $C_4$, diodes $D_5$ and $D_6$ connected in opposite polarities and a filter circuit $S_2$ consisting of the capacitor $C_2$ and the resistor $R_1$ connected in parallel.

With the displacement detecting circuit 1 constructed as set forth above, when the voltage $e$ induced across the output coil $n_2$ of the transformer T has the polarity shown in FIG. 1 by symbols ⊕ and ⊖, current $i_1$ flows through the coil $L_1$, the diode $D_3$, the capacitor $C_1$ and the diode $D_5$, while current $i_2$ flows through the coil $L_2$, the diode $D_2$ and the diode $D_5$, namely the currents $i_1$ and $i_2$ flow in the coils $L_1$ and $L_2$ respectively.

When the polarity of the voltage $e$ induced in the coil $n_2$ is reversed, the current $i_1$ and $i_2$ flow through the diode $D_6$, the capacitor $C_2$, the capacitor $C_1$, the diode $D_4$ and the coil $L_2$ and through the diode $D_6$, the capacitor $C_2$, the diode $D_1$ and the coil $L_1$ respectively. Consequently, current $\Delta i$ passing through the capacitor $C_1$ is the difference between the currents $i_1$ and $i_2$ passing through the coils $L_1$ and $L_2$, a current flowing in the capacitor $C_2$ of the filter circuit $S_2$ is the sum of the currents $i_1$ and $i_2$. In this case if the impedances of the diodes, capacitors and resistor (element) are small enough as compared with those of the coils $L_1$ and $L_2$, the current $i_1$ and $i_2$ are respectively expressed as follows:

$$i_1 = e/(\omega L_{11})$$

$$i_2 = e/(\omega L_{21})$$

where $\omega$ represents an angular frequency of the voltage $e$ and $L_{11}$ and $L_{21}$ impedance values of the coils $L_1$ and $L_2$.

Accordingly, the sum of the currents $i_1$ and $i_2$ and the difference therebetween are expressed as follows:

$$i_1 + i_2 = \frac{e}{\omega}\left(\frac{L_{11}+L_{21}}{L_{11}L_{21}}\right) \quad (1)$$

$$i_1 - i_2 = \frac{e}{\omega}\left(\frac{L_{21}-L_{11}}{L_{11}L_{21}}\right) \quad (2)$$

From the equations (1) and (2) the relationship between $i_1$, $i_2$ and $L_{11}$, $L_{21}$ is deduced as follows:

$$i_1 - i_2 = (i_1 + i_2)\frac{L_{21}-L_{11}}{L_{11}L_{21}} \quad (3)$$

It will be apparent from the equation (3) that if the sum of the currents $i_1$ and $i_2$ is kept constant, the difference between the currents $i_1$ and $i_2$ is proportional to the difference between the inductances $L_{11}$ and $L_{21}$ of the coils $L_1$ and $L_2$, namely to the amount of the displacement of the short-circuit ring 14 mounted on the core member 13 of the differential inductance element (inductor).

With the example depicted in FIG. 1 the sum of the currents $i_1$ and $i_2$ is delivered from the resistor element $R_1$ as the voltage $V_1$ corresponding to the sum of the currents and thus obtained voltage $V_1$ is supplied to the differential amplifier 3 which, in turn, controls the voltage for the oscillator 2 in such a manner that the sum of the currents $i_1$ and $i_2$ may be maintained substantially constant.

References $R_2$ to $R_4$ in the differential amplifier 3 indicate resistor elements respectively which are connected in series with one another. A constant voltage from a zener diode $D_Z$ included in the constant-voltage circuit 6 is applied across the both ends of the series connection of the resistor elements $R_2$ to $R_4$. The connection point between the resistors $R_2$ and $R_3$ is connected to a positive input terminal ⊕ of the differential amplifier 3 while the negative input terminal ⊖ thereof is connected to one terminal $j$ of the filter circuit $S_2$. The other terminal $f$ of the filter circuit $S_2$ is connected to the connection point of the resistors $R_3$ and $R_4$. The output voltage of the differential amplifier 3 is applied to the oscillator 2 as its power source through a diode $D_7$ which is used for preventing passage of reverse current, whereby the oscillator 2 starts its oscillation operation. The oscillation output of the oscillator 2 is derived from the output coil $n_2$ of the transformer T and then applied to the displacement detecting circuit 1 to cause the currents $i_1$ and $i_2$ to flow in the coils $L_1$ and $L_2$ as explained above. In this example the power source voltage of the differential amplifier 3 is obtained from the constant-voltage circuit 6 which is supplied with current from the DC power source 9 through the transmission lines $l$.

The operation of the differential amplifier 3 will be hereinafter explained. As set forth above the voltage $V_1$ corresponding to the sum of the currents $i_1$ and $i_2$ passing through the coils $L_1$ and $L_2$ is applied to the input terminal ⊖ of the differential amplifier 3 while the voltage $V_2$ produced across the resistor $R_3$ is applied to the other input terminal ⊕ of the differential amplifier 3. The differential amplifier 3 produces at its output terminal a voltage corresponding to the difference $\Delta E_1$ between the voltages $V_1$ and $V_2$ but operates to reduce the difference voltage $\Delta E_1$ to substantially zero when the gain thereof is selected high enough. Accordingly, the differential amplifier 3 produces a substantially constant voltage as its output. The constant voltage of the differential amplifier 3 is applied to the oscillator 2 with a result that the output frequency of the oscillator 2 is substantially constant. Consequently, excitation current applied to the differential transformer, namely the sum of the currents flowing through the coils $L_1$ and $L_2$ can be controlled to be an approximately constant value. If the sum of the currents $i_1$ and $i_2$ is held constant, the difference Δi between the currents $i_1$ and $i_2$ which flow through the capacitor $C_1$ of the displacement detecting circuit 1 is exactly proportional to the amount of the displacement of the short-circuit ring 14 mounted on the core member 13 of the differential transformer as apparent from the equation (3).

In the range change circuit 4 shown in FIG. 1, reference characters $R_6$ to $R_{12}$, inclusive, denote range change resistors, respectively. The resistance values of the range change resistors $R_6$ to $R_{12}$ are respectively selected to have values corresponding to a decimal code such, for example, as 1, 2, 4, 0.1, 0.4 and 0.8. Reference characters $S_1$ to $S_7$ inclusive, indicate switching elements. The resistor $R_6$ and the switching element $S_1$, . . . and the resistor $R_{12}$ and the switching element $S_7$ are respectively connected in series with each other and the respective series connections of the resistors $R_6$ to $R_{12}$ and the switching elements $S_1$ to $S_7$ are connected to the capacitor $C_1$ of the displacement detecting circuit 1 in parallel with one another. As explained in connection with the displacement detecting circuit 1, as the short-circuit ring 14 of the differential inductance element is displaced or shifted to change the inductance between the coils $L_1$ and $L_2$ differentially, the difference current $\Delta i$ flows through the capacitor $C_1$ correspondingly. In this case if one or more of the parallel switching elements $S_1$ to $S_7$ is closed a voltage $\Delta V$ expressed by $\Delta iR$ is produced across the resistor or resistors connected to the closed switching element. Since the resistors $R_6$ to $R_{12}$ are selected to follow a decimal code as set forth above, the voltage $\Delta V$ can be changed with in the range of $0.1 \approx 7.0$ in steps of 0.1 by suitably closing one or more switching elements $S_1$ to $S_7$, in other words, the range of the voltage $\Delta V$ can be variable.

In the constant-voltage circuit 6, reference character $Q_1$ indicates a transistor, $Q_2$ a field-effect transistor and $D_8$ a diode which is inserted between the base of the transistor $Q_1$ and one electrode of the Zener diode $D_Z$. The other electrode of the Zener diode $D_Z$ is connected to the output terminal 72 through a feedback resistor $R_{13}$. The source and drain electrodes of the field-effect transistor $Q_2$ are connected to the base and collector electrodes of the transistor $Q_1$ respectively and the gate electrode of the field-effect transistor $Q_2$ is connected to the connection point between the diode $D_8$ and the Zener diode $D_Z$. With this circuit construction the gate of the field-effect transistor $Q_2$ is reverse biased by the forward voltage drop across the diode $D_8$, so that a constant current is applied to the diode $D_Z$. As a result, the constant-voltage circuit 6 operates to keep the power source voltage for the amplifier substantially constant even if the load current $I_0$ changes.

In the amplifier circuit 5 reference numeral 51 designates a differential amplifier and $Q_3$ a transistor the base electrode of which is connected to the output terminal of the differential amplifier 51, the collector electrode of which is connected to the collector electrode of the transistor $Q_1$ and the emitter electrode of which is connected through a resistor $R_{14}$ to one end of the feedback resistor $R_{13}$. Reference characters $R_{15}$ and $R_{16}$ indicate fixed resistors and $R_{17}$ a variable resistor. These resistors $R_{15}$, $R_{17}$ and $R_{16}$ are connected in series and one end of the resistor $R_{15}$ is connected to the emitter electrode of the transistor $Q_1$ and one end of the resistor $R_{16}$ is connected to the output side of the feedback resistor $R_{13}$. The variable resistor $R_{17}$ constitutes the zero point adjusting circuit of this device which will be explained later. The power source voltage for the differential amplifier 51 may be obtained from the constant-voltage circuit 6 which is supplied with current from the DC power source 9 through the transmission line *l*. The input side ⊕ of the differential amplifier 51 is connected to one end of the movable contact of the variable resistor $R_{17}$ while the other input side ⊖ is connected to the connection point of the switching elements $S_1$ to $S_7$ of the range change circuit 4.

The amplifier circuit 5, has its ⊖ input side supplied with the voltage $\Delta V$ produced in the range change circuit 4 while its ⊕ input side is supplied with, as a feedback voltage, the voltage corresponding to the voltage generated across the feedback resistor $R_{13}$ due to the load current $I_0$. The transistor $Q_3$ is driven by an output signal from the differential amplifier 51 to control the load current $I_0$. The differential amplifier 51 operates to make the difference voltage $\Delta E_2$ between the voltages applied to the input sides ⊕ and ⊖ thereof to be substantially zero if the gain of the differential amplifier 51 is made high enough. That is, although voltage applied to the input side ⊕ of the differential amplifier 51 is varied in accordance with the variation of the load current $I_0$, the differential amplifier 51 operates to bring the voltage applied to its ⊕ input side approximately equal to that applied to its ⊖ input side. In this case since the voltage drops across the resistors $R_2$ and $R_3$ are selected substantially constant, the load current $I_0$ is controlled in such a manner that the variation of the voltage applied to the ⊕ input side of the differential amplifier 51, which is caused by the voltage drop across the resistor $R_{13}$ due to the load current $I_0$, becomes approximately equal to the voltage $\Delta V$ produced in the range change circuit 4. The voltage $\Delta V$ can be changed by selectively closing one or more of the switches $S_1$ to $S_7$, so that the load 8 is supplied with current $I_0$ proportional to the amount of the displacement of the short-circuit ring 14 and in correspondence with the range through the transmission line which is also used for power transmission.

In a general process control system, a signal transmitted from a detector for detecting process variables to a receiver side is converted to a uniform or systematic electrical signal of, for example, $4 \approx 20$ milliamperes for the range of $0 \approx 100$ percent of the input signal of the detector. In the event that a base current of, for example, 4 milliamperes exists in the uniform or systematic electrical signal, when the displacement applied to the short-circuit ring 14 of the differential inductor is zero, namely the current $\Delta i$ flowing through the capacitor $C_1$ of the displacement detecting circuit 1 is zero, the movable contact of the variable resistor $R_{17}$ is previously set or adjusted to make the load current $I_0$ 4 milliamperes. With such an adjustment the zero point is prevented from being moved or shifted even if the range is thereafter changed to vary the voltage $\Delta V$ produced in the range change circuit 4.

Figure 3:
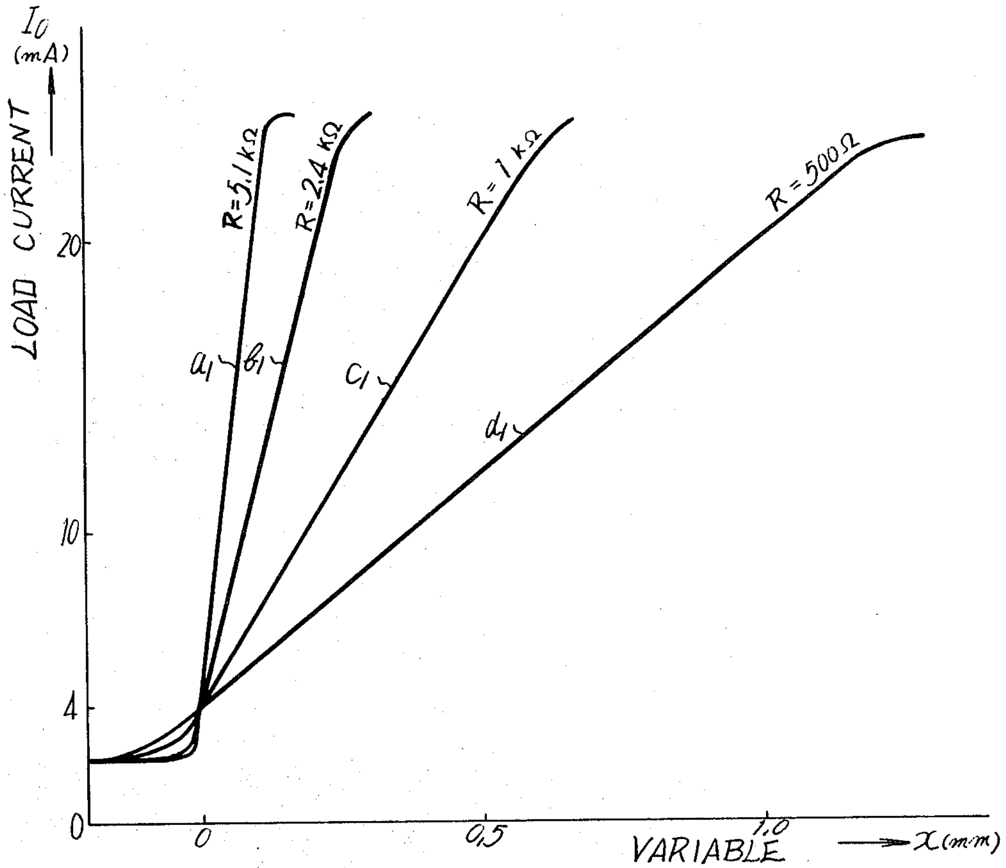
FIG. 3 is a graph illustrating characteristics of the example shown in FIG. 1.

FIG. 3 is a graph showing one example of the experimental results with the device of the present invention shown in FIG. 1 in which the ordinate represents the load current in milliampere, the abscissa the distance X of the short-circuit ring 14 of the differential inductor in millimeter and the range change resistor R as a parameter. In the graph, a curve $a_1$ corresponds to the case where R is 5.1 KΩ (kilo-ohms); a curve $b_1$ the case where R 2.4 KΩ; and curves $c_1$ and $d_1$ the cases where R are 1 KΩ and 500Ω, respectively.

With conventional apparatus when there is base current, zero point adjustment must be made every time when the range is changed.

According to the present invention, on the contrary, since the apparatus is adjusted in such a manner that the load current becomes a base current when an input signal is zero, the zero point is not shifted even when the resistor R is varied as apparent from the graph, which will means that change of the range can be easily carried out. In addition, according to the present invention since an oscillation frequency of the oscillator 2 may be selected high such, for example, as 50 $KH_Z$, the values of the coils $L_1$, $L_2$ and the capacitors can be made small. Consequently, the device is safe.

Figure 4:
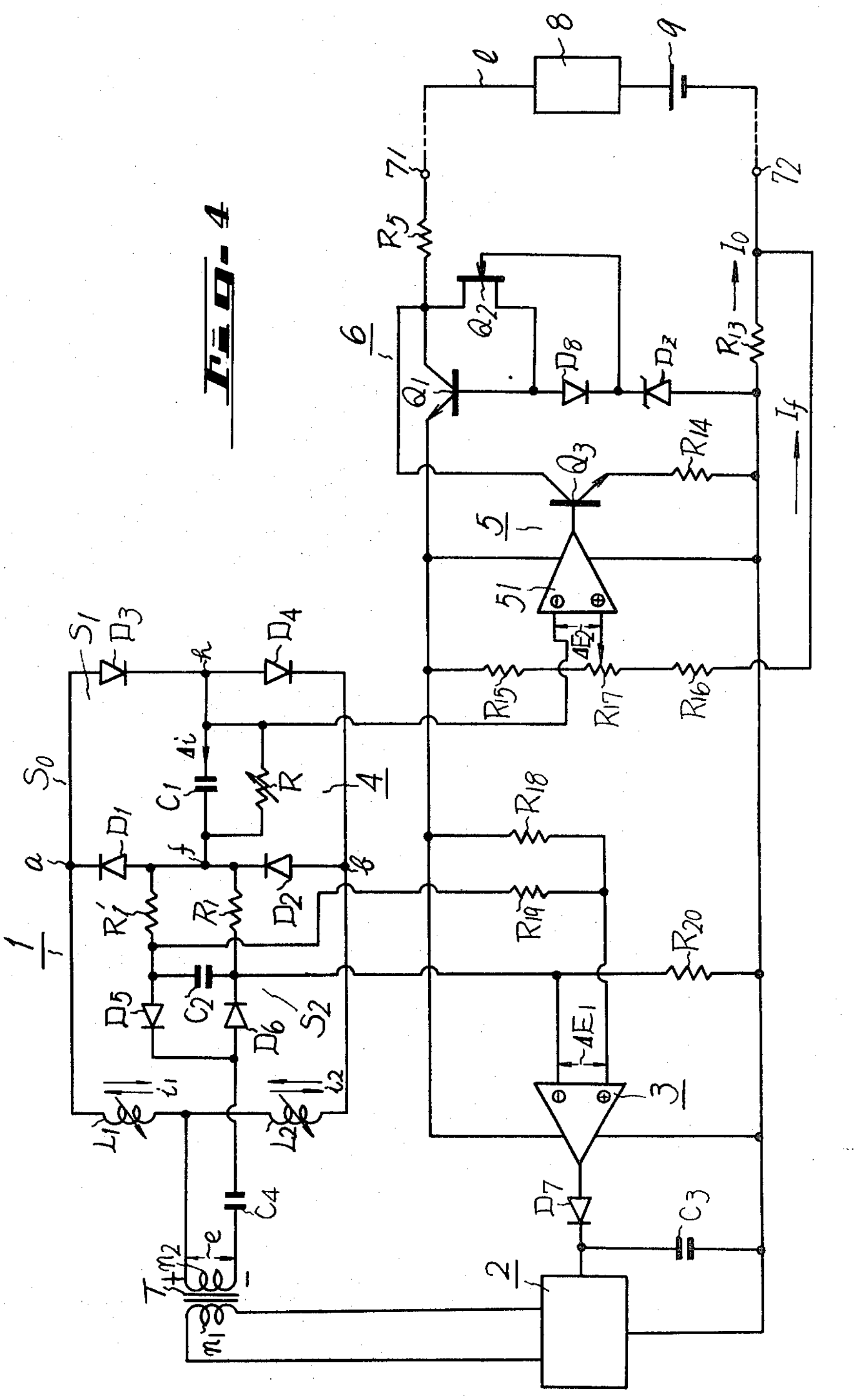
FIGS. 4 to 7, inclusive, are respectively electric connection diagrams illustrating other embodiments of the present invention.

FIG. 4 shows another embodiment of the present invention in which similar references indicate similar elements or components of the example shown in FIG. 1. In the example shown in FIG. 1 the positive electrode or anode of the diode $D_5$ of the displacement detecting circuit 1 is directly connected to the output terminal *f* of the rectifier circuit $S_1$, while in FIG. 4 example the anode of the diode $D_5$ is connected to the output terminal *f* through a resistor $R_1'$ the resistance value of which is substantially equal to that of the resistor $R_1$ connected to the cathode of the diode $D_6$. Further, in FIG. 4 example the input terminals ⊕ and ⊖ of the differential amplifier 3 are respectively supplied with a voltage produced in a resistor $R_{19}$ and a voltage across the capacitor $C_2$, the resistor $R_{19}$ being connected between the anode of the diode $D_5$ and the ⊕ input terminal of the differential amplifier 3, and the capacitor $C_2$ being inserted between the anode of the diode $D_5$ and the ⊖ input terminal of the differential amplifier 3. The differential amplifier 3 of this embodiment thus supplied with the voltages at its input terminals operates to make the voltage difference between the voltages applied thereto to be substantially zero, to thereby control a power source voltage applied to the oscillator 2 so that it remains approximately constant.

With such an arrangement currents $i_1$ and $i_2$ respectively flow through the diodes $D_5$ and $D_6$ through the resistors $R_1$ and $R_1'$ of equal resistance value, namely the currents $i_1$ and $i_2$ flow through the rectifier circuit $S_1$ symmetrically, so that an apparatus which is less affected by noises as compared with the FIG. 1 example is provided.

Although in FIG. 4 the range change circuit 4 is exemplified only by a single variable resistor R, its detailed construction is substantially the same as that shown in FIG. 1.

With this arrangement, it can be also possible as in the case of the FIG. 1 example that the range of the voltage $\Delta V$ may be varied by changing the value of the resistor R without adjusting the zero point and also that the zero point may be adjusted by suitably changing the variable resistor $R_{17}$. Other construction, features and operations of FIG. 4 example are substantially the same as those of the FIG. 1 example, and the explanation is omitted for the sake of simplicity.

Figure 5:
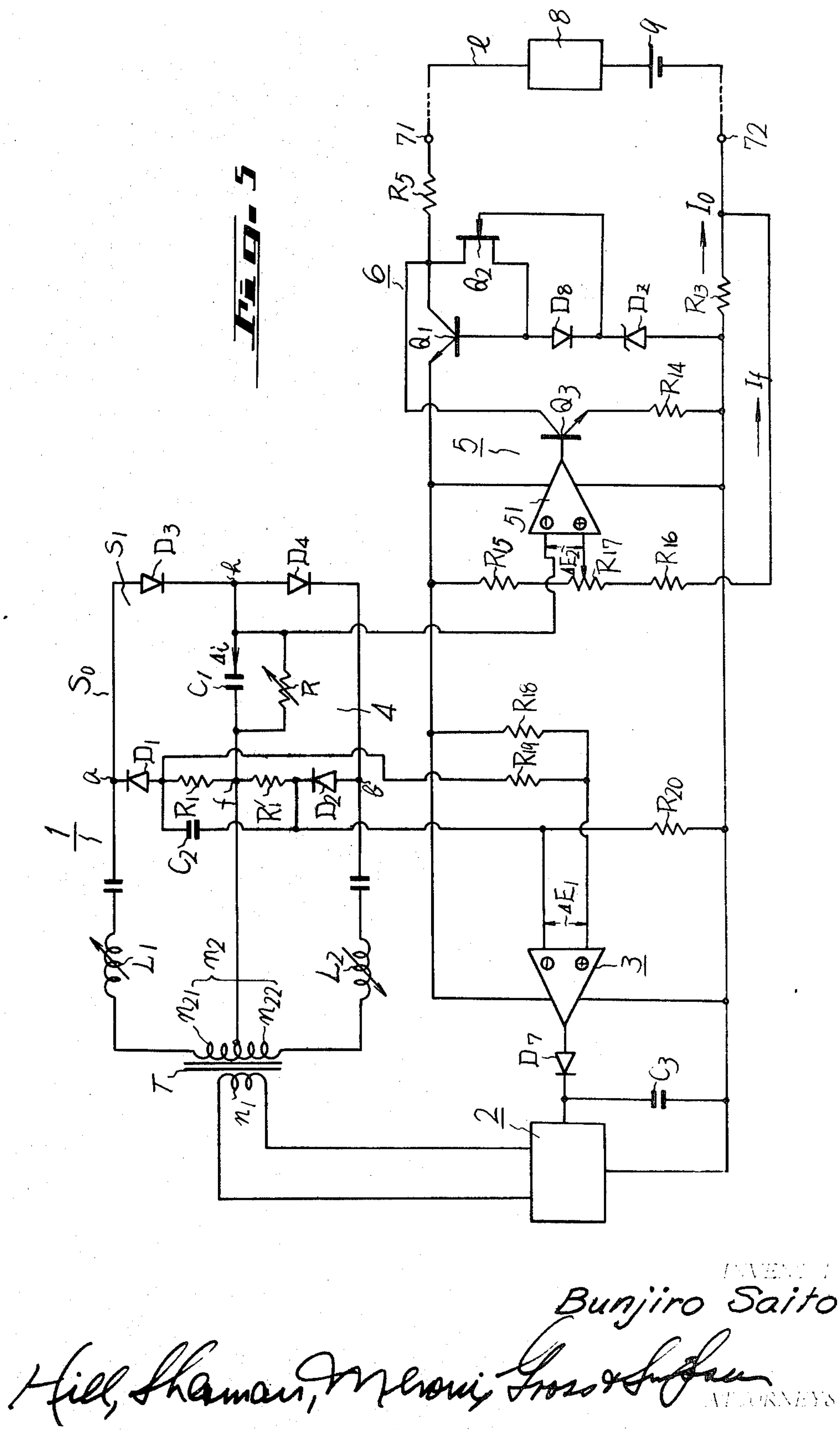

FIG. 5 shows another modified form of the present invention in which like references designate like elements or components to those of the foregoing examples. The main difference in construction between this example and the FIG. 4 example resides in the displacement detecting circuit 1 and the other constructions are substantially same to those of FIG. 4 example.

In the displacement detecting circuit 1 of the FIG. 5 example, reference character $n_2$ indicates the secondary coil of the transformer T which is divided approximately at its center into two coil portions $n_{21}$ and $n_{22}$. One end of the coil, for example, $n_{21}$ is connected to the input terminal *a* of the rectifier circuit $S_1$ and one end of the other coil $n_{22}$ to the input terminal *b* of the rectifier circuit $S_1$. The center point of the output coil $n_2$ is connected to the output terminal *f* of the rectifier circuit $S_1$ and one sides of the diodes $D_1$ and $D_2$ are connected to the output terminal *f* through the resistors $R_1$ and $R_1'$ which have the same resistance values. In this example the capacitor $C_2$ is connected to the series circuit of the resistors $R_1$ and $R_1'$ and in parallel therewith. One end this parallel connection is connected to the ⊖ input terminal of the differential amplifier 3 and the other end is connected to the ⊕ input terminal of the amplifier 3 through the resistor $R_{19}$.

According to the example with the displacement detecting circuit 1 constructed as set forth above, current corresponding to the sum of the inductances of the coils $L_1$ and $L_2$ also flow through the capacitor $C_2$ while current proportional to the difference of inductance flows through the capacitor $C_1$. The differential amplifier 3 operates to equalize the voltage across the capacitor $C_2$ and the voltage across the resistor $R_{19}$, to thereby control the power source voltage to the oscillator 2 with a result that current passing through the capacitor $C_2$ is maintained approximately constant.

The currents $i_1$ and $i_2$ flowing through the capacitor $C_1$ of the FIG. 4 example are different in phase by 180° but currents $i_1$ and $i_2$ of the FIG. 5 example are in phase. Consequently, the capacity values of the capacitors $C_1$ and $C_2$ of this example can be made small as compared with those of FIG. 1 example and the rectifier circuit $S_1$ may be manufactured at a low price.

Figure 6:
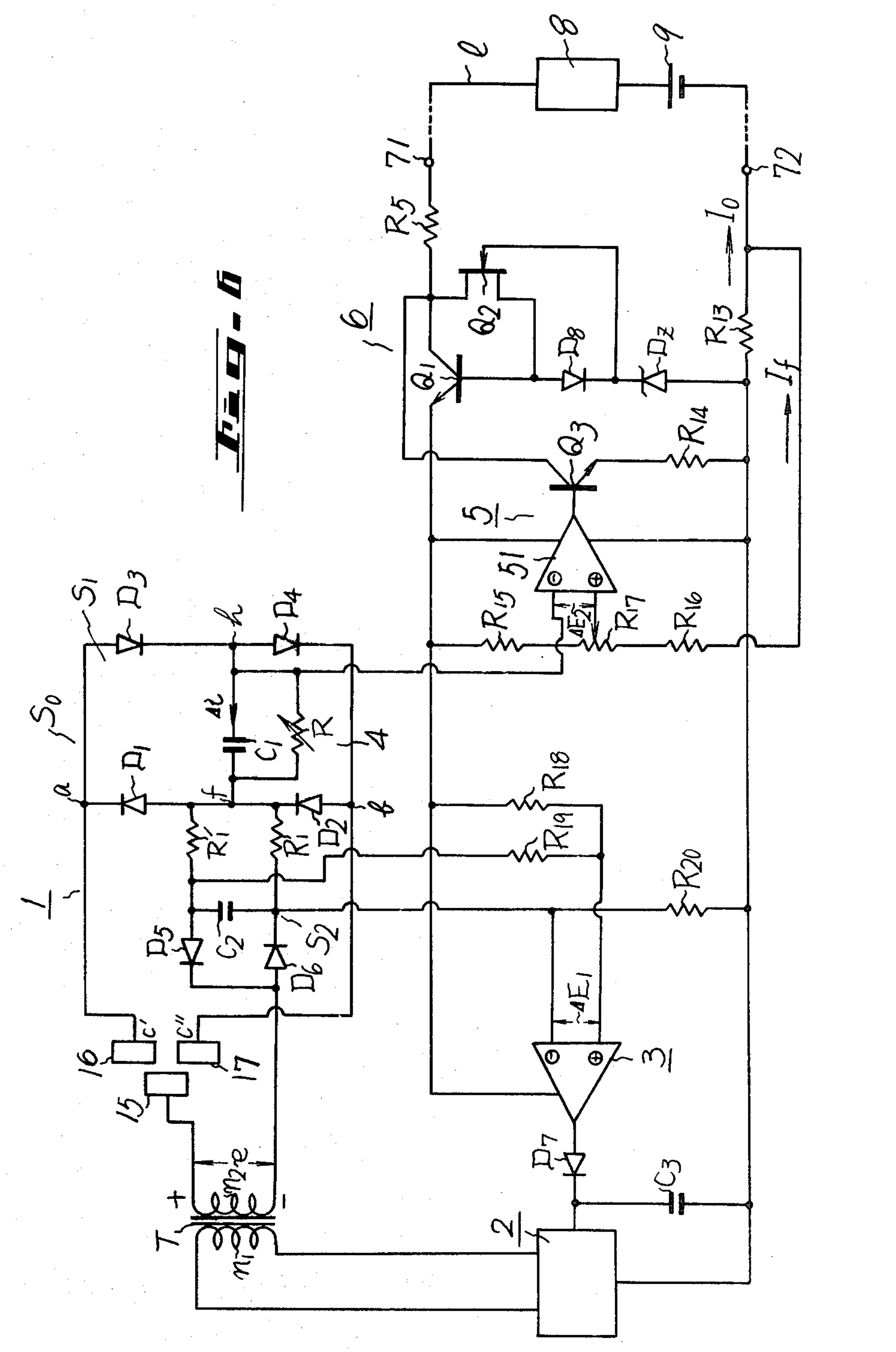

FIG. 6 is a still another modified form of the present invention in which similar reference numerals to those of the foregoing examples represent similar elements or components. In the examples shown in FIGS. 1, 4 and 5 the mechanical displacement is converted into corresponding electric signals by means of inductors, corresponding to inductance changes thereof but in the FIG. 6 examply the mechanical displacement is converted into a corresponding electrical signal by the utilization of capacitors, corresponding to capacitance changes.

In the FIG. 6 example reference numeral 15 designates a movable electrode plate one end of which is connected to the output coil $n_2$ of the transformer T and 16 and 17 designate fixed electrode plates adjacent the movable electrode plate 15 but spaced therefrom. The fixed electrode plates are respectively connected to the output terminals *a* and *b* of the rectifier circuit $S_1$, whereby a differential capacitance type displacement detector is formed. The other construction and operation of this example are substantially same to those of the examples shown in FIGS. 4 and 5.

With such an arrangement when the movable electrode plate 15 is displaced in response to the mechanical displacement, the capacitance values C′ and C″ between the movable electrode 15 and the fixed electrodes 16, 17 are varied differentially, whereby current in accordance with the capacitance variation flows through the rectifier circuit $S_1$. In this case the current $\Delta i$ corresponding to the difference between the capacitance values C′ and C″ flows in the capacitor $C_1$, while the current corresponding to the sum of the capacitance values C′ and C″ flows in the capacitor $C_2$ as explained in connection with FIG. 1 example. The differential amplifier 3 of this example operates to equalize the voltage across the capacitor $C_2$ with that across the resistor $R_{19}$, to thereby control the power source voltage for the oscillator 2 as in the foregoing examples.

Figure 7:
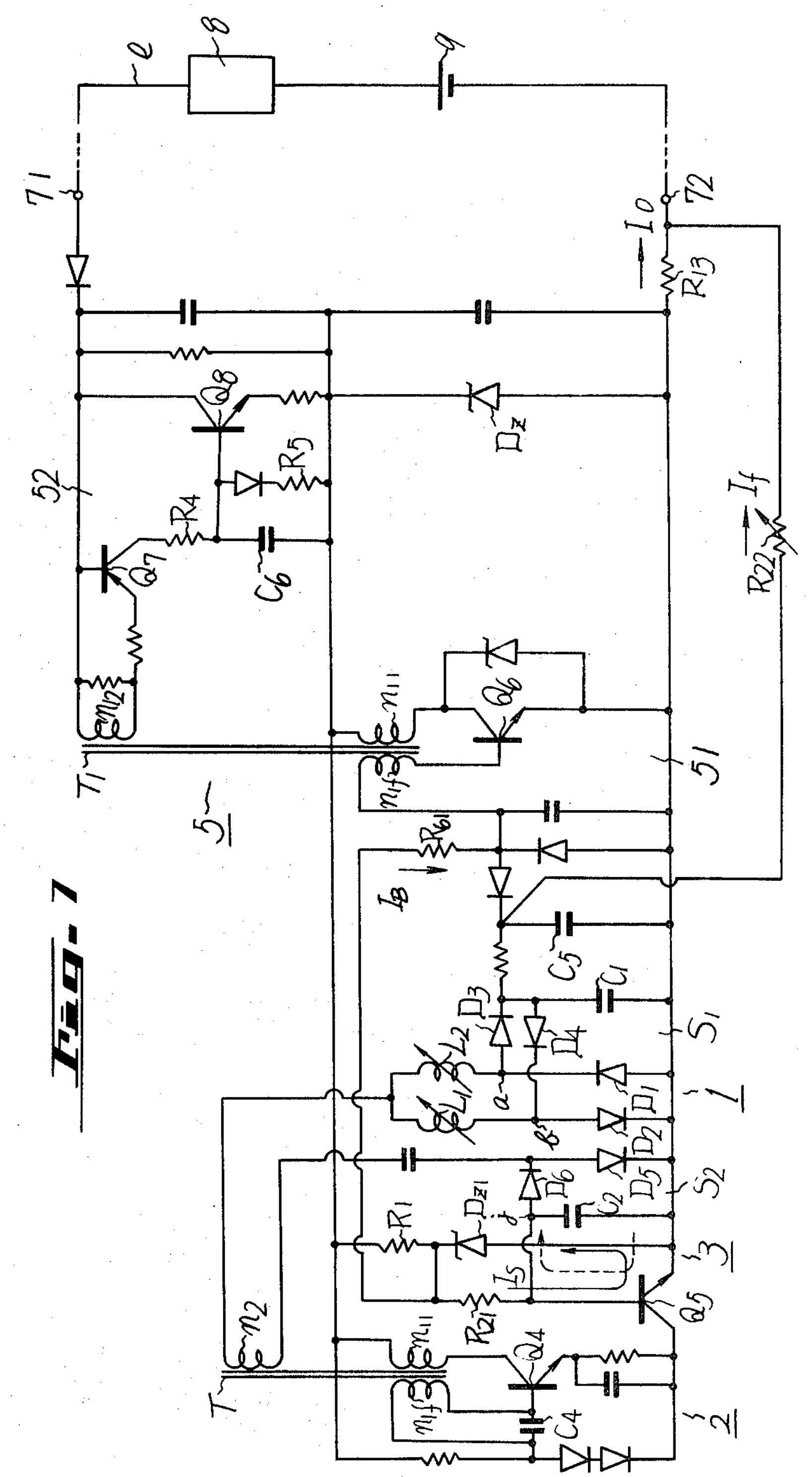

FIG. 7 shows a further modified form of the present invention. In the figure reference numeral 1 designates the displacement detecting circuit which includes coils $L_1$ and $L_2$, 2 the oscillator, 3 a control circuit, corresponding to the differential amplifier 3 in the foregoing examples, to control the power source voltage for the oscillator 2 and 5 the current amplifier circuit which employs a blocking oscillator.

The oscillator 2 of this example is a back coupling type oscillator employing a transistor $Q_4$. This oscillator 2 oscillates at the natural frequency of a tuning circuit consisting of a feedback winding $n_1f$ of the transformer T connected to the base of the transistor $Q_4$ and a capacitor $C_4$ connected in parallel to the winding $n_1f$. The oscillation amplitude of the oscillator 2 is changed in accordance with the magnitude of the power source voltage applied thereto. The oscillator 2 is supplied with a voltage from a power source including the Zener diode $D_Z$ which is, in turn, supplied with a current from the DC power source 9 through the transmission line $l$. The control circuit 3 comprises a transistor $Q_5$ and is inserted between the oscillator 2 and the Zener diode $D_Z$. The base of the transistor $Q_5$ is connected to the connection point of a resistor $R_{11}$ and a Zener diode $D_{Z1}$ through a resistor $R_{21}$, the series connection of the resistor $R_{11}$ and the Zener diode $D_{Z1}$ being connected to the Zener diode $D_Z$ in parallel, whereby the base of the transistor $Q_5$ is supplied with a constant reference or standard current $I_S$. The inductance values of the coils $L_1$ and $L_2$ in the displacement detecting circuit 1 is differentially changed in accordance with the displacement of the short-circuit ring 14 as described above, so that the capacitor $C_1$ permits therethrough passage of the current corresponding to the difference between the inductance values of the coils $L_1$ and $L_2$ while the capacitor $C_2$ permits therethrough passage of the current corresponding to the sum of the inductances of the coils $L_1$ and $L_2$. In this example the output terminal $j$ of the rectifier circuit $S_2$ is connected to the base of the transistor $Q_5$ of the control circuit 3 to apply the current corresponding to the sum of the inductances of the coils $L_1$ and $L_2$ to the transistor $Q_5$ in the counter-direction to the reference current $I_S$ as shown by a dotted line in the figure. The current amplifier circuit 5 includes a blocking oscillator 51 which has a transistor $Q_6$ and coils $n_1f$ and $n_{11}$. To the input side of the blocking oscillator 51 is connected the aforementioned filter circuit $S_1$. The power source of the blocking oscillator 51 is obtained from the Zener diode $D_Z$ which is supplied with current from the DC power source 9 through the transmission line $l$ as described above, while a bias current $I_B$ is applied from the Zener diode $D_{Z1}$ through a resistor $R_{61}$. In the figure reference numeral 52 is a circuit including transistors $Q_7$ and $Q_8$, which rectifies and amplifies an output of the blocking oscillator 51 produced at the secondary winding $n_{12}$ of a transformer $T_1$ to control the load current $I_0$ flowing through the transmission line $l$. Reference character $R_{22}$ indicates a variable resistor which is connected between the output end of the feedback resistor $R_{13}$ and the output side of the filter circuit $S_1$ and feedbacks current $I_f$ due to a voltage produced in the resistor $R_{13}$ by the load current $I_0$ to the input side of the blocking oscillator 51.

With the arrangement shown in FIG. 7 the current corresponding to the sum of the inductances of the coils $L_1$ and $L_2$ are compared with the reference current $I_S$ from the Zener diode $D_{Z1}$ and the difference current therebetween is applied to the base of the transistor $Q_5$, so that as the sum current is increased the base current of the transistor $Q_5$ is decreased with a result that the voltage between the collector and emitter of the transistor $Q_5$ is increased to reduce the power source voltage to the oscillator 2, while as the sum current is decreased to enhance the base current of the transistor $Q_5$, the voltage across the collector-emitter of the transistor $Q_5$ is lowered with a result that the voltage to the oscillator 2 is enhanced and the power source voltage for the oscillator 2 is controlled to maintain the sum current approximately constant. The current passing through the capacitor $C_1$ which corresponds to the difference between the inductances of the coils $L_1$ and $L_2$ is fed to the blocking oscillator 51 of the current amplifier circuit 5, whereby the voltage across the capacitor $C_5$ of the blocking oscillator 51 is increased. As a result, the bias current $I_B$ flows as a base current of the transistor $Q_6$, so that the transistor $Q_6$ is made conductive by blocking oscillation thereof. When the transistor $Q_6$ is made conductive and its output is applied to the transistor $Q_7$ through the same transformer $T_1$, the current as to the emitter current of the transistor $Q_7$ flows in its collector through resistors $R_4$ and $R_5$. The pulse voltage caused thereby is smoothed by a capacitor $C_6$ connected to the resistor $R_4$ and then supplied to the base of the transistor $Q_8$ which, in turn, controls the load current $I_0$ flowing through the transmission line $l$ in accordance with the voltage supplied to its base. The load current $I_0$ causes generation of a voltage across the resistor $R_{13}$ which produces the feedback current $I_f$ flowing through the resistor $R_{22}$. As a result, the input current is amplified such that the input current is balanced with the feedback current $I_f$. Consequently, the output current $I_0$ flowing through the load 8 corresponds to the difference between the inductances of the coils $L_1$ and $L_2$.

Since in the present example the current corresponding to the difference between the inductances of the coils $L_1$ and $L_2$ is amplified by the current amplifier circuit employing the blocking oscillator as set forth above, the present example is less affected by variations of temperature of the surroundings.

It is possible in FIG. 7 example to employ capacitors shown the FIG. 6 instead of the coils $L_1$ and $L_2$.

A change of the range is obtained by controlling variable resistor $R_{22}$.

It will be apparent that many modifications and variations may be effected without departing from the scope of the novel concepts of this invention.

We claim as our invention:

1. A displacement-electric signal converter comprising:

a pair of displacement sensing means connected in series and having impedances which are differentially changed in accordance with a mechanical displacement;

a rectifier circuit consisting of a plurality of diodes connected as a bridge circuit, said series-connected pair of displacement sensing means being connected between the input terminals of said bridge circuit, first and second capacitors, said first capacitor being connected between the output terminals of said bridge circuit, said second capacitor having means connecting one end to the connection point of said pair of displacement sensing means and its other end connected to one of the output terminals of said bridge circuit;

a current corresponding to the difference between the impedances of said pair of displacement sensing means being obtained from said first capacitor;

a current corresponding to the sum of said impedances being obtained from said second capacitor;

an oscillator with its output side coupled to said pair of displacement sensing means for applying A. C. current to said pair of displacement sensing means;

a differential amplifier circuit with one input terminal connected to said second capacitor, the other input terminal of said differential amplifier supplied with a constant voltage and the output side of said differential amplifier connected to said oscillator for providing the electric power source voltage for said oscillator to maintain substantially constant current flowing through said second capacitor;

a second amplifier to which the voltage across both terminals of said first capacitor is supplied for amplifying current flowing through said first capacitor; and a means including a D. C. electric power source of said second amplifier for transmitting the output signal of said second amplifier to a load.

2. A displacement-electric signal converter as claimed in claim 1 in which said pair of displacement sensing means consist of a pair of differential inductors.

3. A displacement-electric signal converter as claimed in claim 1 in which said pair of displacement sensing means consist of a pair of capacitors.

4. A displacement-electric signal converter as claimed in claim 1 in which said second amplifier is a second differential amplifier one input terminal of which is supplied with voltage across said first capacitor and the other input terminal of which is supplied with a feedback voltage, said second differential amplifier controlling a load current to make the voltage difference between said voltages applied to its input terminals substantially zero.

5. A displacement-electric signal converter as claimed in claim 1 which comprises a circuit for comparing current passing through said second capacitor with a reference current and controlling the electric power source voltage of said oscillator in accordance with the difference between said currents, and a third amplifier employing a blocking oscillator for amplifying current passing through said first capacitor.

6. A displacement-electric signal converter as claimed in claim 1 which further includes a range change circuit connected in parallel to said first capacitor for changing the range of voltage across said first capacitor.

7. A displacement-electric signal converter as claimed in claim 6 in which said range change circuit includes a plurality of circuits each comprising a resistor and a switching element connected in series, and each of said circuits connected in parallel with said first capacitor.

8. A displacement-electric signal converter as claimed in claim 4 which includes a zero point adjusting circuit which adjusts the zero point of the converter by controlling the feedback voltage from said second differential amplifier.

9. A displacement-electric signal converter as claimed in claim 8 in which said zero point adjusting circuit consists of a variable resistor element.

10. A displacement-electric signal converter as claimed in claim 5 in which a means is provided for changing the range by varying a feedback current of said blocking oscillator.

* * * * *